US010007406B1

(12) United States Patent
Libin

(10) Patent No.: US 10,007,406 B1
(45) Date of Patent: Jun. 26, 2018

(54) ADAPTIVE WRITING INTERFACE

(71) Applicant: Evernote Corporation, Redwood City, CA (US)

(72) Inventor: Phil Libin, San Jose, CA (US)

(73) Assignee: EVERNOTE CORPORATION, Redwood City, CA (US)

(*) Notice: Subject to any disclaimer, the term of this patent is extended or adjusted under 35 U.S.C. 154(b) by 393 days.

(21) Appl. No.: 14/943,154

(22) Filed: Nov. 17, 2015

Related U.S. Application Data

(60) Provisional application No. 62/083,440, filed on Nov. 24, 2014.

(51) Int. Cl.
*G06F 3/0484* (2013.01)
*G06F 3/01* (2006.01)
*G06F 1/16* (2006.01)
*G06F 17/24* (2006.01)

(52) U.S. Cl.
CPC ........... *G06F 3/0484* (2013.01); *G06F 1/163* (2013.01); *G06F 3/013* (2013.01); *G06F 3/017* (2013.01); *G06F 17/24* (2013.01)

(58) Field of Classification Search
CPC .................................................. G06F 3/0484
USPC ........................................................ 715/767
See application file for complete search history.

(56) References Cited

U.S. PATENT DOCUMENTS

| | | | | |
|---|---|---|---|---|
| 6,304,234 B1 * | 10/2001 | Horiuchi | ............... | G02B 27/017 345/1.3 |
| 8,971,572 B1 * | 3/2015 | Yin | .................... | G06K 9/00355 345/173 |
| 9,076,457 B1 * | 7/2015 | Orler | .......................... | G06F 3/16 |
| 9,317,196 B2 * | 4/2016 | Fong | ..................... | G06F 3/0488 |
| 2005/0206656 A1 * | 9/2005 | Cooper | ................. | G06T 11/203 345/660 |
| 2006/0026536 A1 * | 2/2006 | Hotelling | .............. | G06F 3/0418 715/863 |
| 2006/0233536 A1 * | 10/2006 | Shuhami | ............... | G06F 1/1626 386/230 |
| 2008/0118237 A1 * | 5/2008 | Wegenkittl | ........... | G06F 3/0481 396/76 |
| 2008/0266458 A1 * | 10/2008 | Whittaker | ........... | H04N 5/2628 348/581 |
| 2008/0310747 A1 * | 12/2008 | Anderson | ............ | G06T 11/203 382/249 |
| 2009/0109182 A1 * | 4/2009 | Fyke | ..................... | G06F 3/0488 345/173 |

(Continued)

*Primary Examiner* — Reza Nabi
(74) *Attorney, Agent, or Firm* — Morgan, Lewis & Bockius LLP

(57) ABSTRACT

Adapting an interface for a word processor includes automatically switching to a focus mode in response to detecting that a user is entering text into a document being entered for a first amount of time, where in the focus mode, a window of the word processor shows only text of the document and includes automatically switching to a perspective mode in response to detecting that a user has stopped entering text for a second amount of time, where in the perspective mode, the window of the word processor includes user-actuated controls to apply formatting to the document, save the document, and import non-textual objects into the document. The second amount of time may vary according to whether a user is looking at the window of the word processor. Font size may be enlarged when the word processor is in the focus mode.

24 Claims, 4 Drawing Sheets

(56) References Cited

U.S. PATENT DOCUMENTS

| | | | | |
|---|---|---|---|---|
| 2009/0228792 | A1* | 9/2009 | van Os | G06F 3/0488 |
| | | | | 715/702 |
| 2009/0300511 | A1* | 12/2009 | Behar | G06F 1/162 |
| | | | | 715/745 |
| 2010/0033505 | A1* | 2/2010 | Hsieh | G09G 5/36 |
| | | | | 345/660 |
| 2010/0066764 | A1* | 3/2010 | Refai | G06F 3/04886 |
| | | | | 345/660 |
| 2010/0070888 | A1* | 3/2010 | Watabe | G06F 3/0481 |
| | | | | 715/760 |
| 2010/0159892 | A1* | 6/2010 | Dunnam | G10L 21/06 |
| | | | | 455/413 |
| 2010/0235729 | A1* | 9/2010 | Kocienda | G06F 1/1626 |
| | | | | 715/255 |
| 2010/0328317 | A1* | 12/2010 | Lindfors | G06T 3/40 |
| | | | | 345/468 |
| 2011/0010668 | A1* | 1/2011 | Feldstein | G06F 3/0488 |
| | | | | 715/822 |
| 2011/0157028 | A1* | 6/2011 | Stallings | G06F 3/04883 |
| | | | | 345/173 |
| 2012/0110501 | A1* | 5/2012 | Baek | G06F 3/0481 |
| | | | | 715/800 |
| 2013/0042199 | A1* | 2/2013 | Fong | G06F 3/0488 |
| | | | | 715/780 |
| 2013/0179800 | A1* | 7/2013 | Jeong | G06F 3/04817 |
| | | | | 715/752 |
| 2013/0343572 | A1* | 12/2013 | Lee | H04M 1/03 |
| | | | | 381/92 |
| 2015/0205490 | A1* | 7/2015 | Nordstrom | G06F 3/04842 |
| | | | | 715/739 |

* cited by examiner

ADAPTIVE WRITING INTERFACE

CROSS-REFERENCE TO RELATED APPLICATIONS

This application claims priority to U.S. Prov. App. No. 62/083,440, filed Nov. 24, 2014, and entitled "ADAPTIVE WRITING INTERFACE," which is incorporated by reference herein.

TECHNICAL FIELD

This application relates to the fields of data entry and graphical user interface, and more particularly to the field of document editing with automatic detection of, and switching between, editing modes.

BACKGROUND OF THE INVENTION

Efficient document creation and editing is at the core of modern productivity. Every year, users produce hundreds of billions of electronic documents: papers, reports, proposals, letters, notes, memos, spreadsheets, completed forms and other types of documents, additionally, billions of hard copies of documents are printed and converted back into digital formats. Productivity software serves as the main tool in document authoring. By some forecasts, the number of business users of software productivity suites will grow from 630 million back in 2013 to 1.2 billion users by 2022.

A key component of most productivity suites is a word processor—a writing application for creating different types of documents. Most word processors are predominantly text based but are capable of including enhanced formats of textual data, such as bulleted and numbered lists, tables, indexes, references, footnotes, etc., as well as other data types, including images and business graphics. The existing worldwide market of desktop word processors is dominated by Microsoft Word®. According to company estimates, Microsoft Word is used by more than a half of billion people worldwide, compared with approximately 750 million users of all Microsoft Office products.

Other market studies put Microsoft Word's worldwide market share above 70%, while in top three countries by population (China, India and United States) it ranges from 68% to 88%. The next most popular office suite, OpenOffice, scores around 11% of the worldwide market share, with Apple iWork, Corel WordPerfect and Google Docs accounting for single digit percentages.

Through almost 40 years since the release of the first WYSYSIG (What-You-See-Is-What-You-Get) word processor, a Xerox PARC Bravo document preparation program, document editing software has developed extensive and sophisticated feature sets for input, manipulation, formatting, and output of documents, which may contain text, item lists, tables, embedded graphics, forms and other templates, references, and many more object types. Thus, a feature band (or similar), normally appearing on top of the application window in recent versions of Microsoft Word, includes a dozen or so tabs, each offering numerous feature buttons and menus. For example, a Home tab of the feature band in some versions of Microsoft Word is subdivided into Clipboard, Font, Paragraph, Styles, and Editing sections, each containing many subordinate feature groups and basic features, such as font properties, paragraph alignment, bullet types and line space parameters, custom styles, etc. Similar extensive feature sets are characteristic for other popular word processors.

Contemporary word processors are built and evolving with the purpose of rich document editing and are aimed at creation of presentable high quality documents, helping many categories of office and home users in their everyday document authoring needs. However, this evolution is simultaneously creating a conflict and growing a gap between the extensive feature sets and the requirements of a modern dynamic and mobile lifestyle. A need exists for quick and undistracted creation, compilation and sharing of information between multiple desktop and mobile devices for a broad variety of documents types, from brief memos and snapshots of ideas to meeting notes, design drafts and annotated snippets of clipped and compiled materials. Creation of the documents should emphasize focus on the content over its presentable formatting and value simplicity of user interface over a rich feature set. Traditional software applications that occupy a significant portion of screen with user interface options for document authoring features are often inefficient and distractive, and so is a cluttered multi-window desktop layout, customarily overloaded by multiple windows of potentially unrelated applications.

WYSIWYG document processing may include three modes with different document display capabilities: a composition mode, a layout mode, and a preview mode. In most word processors, switching between modes is purely manual, and users are not allowed to use, for example, a preview mode for editing the document as close to a final printable or displayable view as possible.

Challenges facing a conventional word processing user interface and workflow have stimulated an increased use of simplified text entry applications, such as notepads on various platforms and diverse versions of the Markdown application where plain text entry is accompanied by mnemonic inline formatting primitives. While these applications are making a step in the right direction, they don't solve the problem of focusing a user on writing and uncluttering a desktop environment. They also rely on a user's ability to memorize and efficiently use formatting primitives, which arguably narrows the audience.

Accordingly, it is desirable to design new systems, processes and methods facilitating writing process and document composition.

SUMMARY OF THE INVENTION

According to the system described herein, adapting an interface for a word processor includes automatically switching to a focus mode in response to detecting that a user is entering text into a document being entered for a first amount of time, where in the focus mode, a window of the word processor shows only text of the document and includes automatically switching to a perspective mode in response to detecting that a user has stopped entering text for a second amount of time, where in the perspective mode, the window of the word processor includes user-actuated controls to apply formatting to the document, save the document, and import non-textual objects into the document. The second amount of time may vary according to whether a user is looking at the window of the word processor. The second amount of time may be adjusted based on at least one of: eye-tracking, spatial gesture recognition of the user, physical activities of the user, attention span of the user between applications, content scanning of the user, and changes in position of the user. The spatial gestures and position of the user may be determined using spatial sensors of wearable devices of the user. The wearable devices of the user may include activity tracking wristware, position sensing wristware, smart glasses, smart clothing, and/or smart earware. The window of the word processor may be maximized to a size of a computer screen when the word processor is in the focus mode. Font size may be enlarged when the word processor is in the focus mode. Adapting an interface for a word processor may also include switching to an auto-clipping mode in response to a user selecting a fragment from a different application, where, in the auto-clipping mode, the fragment is automatically pasted into the document in response to the user finishing selection of the fragment and/or the user positioning a cursor inside the window of the word processor. The user may finish selection of the fragment by releasing a mouse button and, in response thereto, text from the application may be inserted at a location in the document corresponding to a location of the cursor in the document prior to selecting the fragment. Following pasting the fragment, the user may be presented with a button that allows the user to undo pasting the fragment. Auto-clipping may be performed when the user places the window of the word processor next to a window of the different application prior to selecting the fragment. The user may be presented with a button that allows the user to accept or reject automatically switching into one of the modes. Parameters for switching between modes may be based, at least in part, on previous choices made by the user to accept or reject automatically switching into one of the modes.

According further to the system described herein, a non-transitory computer-readable medium contains software that adapts an interface for a word processor. The software includes executable code that automatically switches to a focus mode in response to detecting that a user is entering text into a document being entered for a first amount of time, where in the focus mode, a window of the word processor shows only text of the document and includes executable code that automatically switches to a perspective mode in response to detecting that a user has stopped entering text for a second amount of time, wherein in the perspective mode, the window of the word processor includes user-actuated controls to apply formatting to the document, save the document, and import non-textual objects into the document. The second amount of time may vary according to whether a user is looking at the window of the word processor. The second amount of time may be adjusted based on at least one of: eye-tracking, spatial gesture recognition of the user, physical activities of the user, attention span of the user between applications, content scanning of the user, and changes in position of the user. The spatial gestures and position of the user may be determined using spatial sensors of wearable devices of the user. The wearable devices of the user may include activity tracking wristware, position sensing wristware, smart glasses, smart clothing, and/or smart earware. The window of the word processor may be maximized to a size of a computer screen when the word processor is in the focus mode. Font size may be enlarged when the word processor is in the focus mode. The software may also include executable code that switches to an auto-clipping mode in response to a user selecting a fragment from a different application, where, in the auto-clipping mode, the fragment is automatically pasted into the document in response to the user finishing selection of the fragment and/or the user positioning a cursor inside the window of the word processor. The user may finish selection of the fragment by releasing a mouse button and, in response thereto, text from the application may be inserted at a location in the document corresponding to a location of the cursor in the document prior to selecting the fragment. Following pasting the fragment, the user may be presented with a button that allows the user to undo pasting the fragment. Auto-clipping may be performed when the user places the window of the word processor next to a window of the different application prior to selecting the fragment. The user may be presented with a button that allows the user to accept or reject automatically switching into one of the modes. Parameters for switching between modes may be based, at least in part, on previous choices made by the user to accept or reject automatically switching into one of the modes.

The proposed system provides a focus mode of a word processor where formatting and other options for the user interface are automatically hidden and the word processing application window is zoomed in for writing. The system tracks user behavior and detects the times of starting or resuming writing activities, as well as interruptions and switching to other activities, to alter the application appearance between the focus mode and a conventional perspective mode where the user may apply formatting, save documents, import non-textual objects and perform other non-writing activities with user-actuated controls provided in the word processing application window. Additionally, the system may automatically maximize the application window of the word processing application to make better use of the device screen. The system may also provide an auto-clipping mode where adjacent application window(s) may represent sources of clipped materials and where, upon an end of selection of a fragment from such adjacent application window, the system may automatically return to the maximized focus mode and enter the selected fragment at a cursor location after the user positions the cursor inside the word processor window.

Aspects of system workflow and user interface are explained below:
1. A user launches one or several applications, including a word processor with an auto-focusing capability.
2. The system tracks user behavior using available run-time metrics, such as:
   a. Periods of active status of application windows.
   b. Timeouts after the most recent interactions with each active application.
   c. Activity cycles, including types, durations and intervals between activities in each application window.
   d. Data transfer between application windows using a system clipboard or other mechanisms (such as dragging compatible objects between application windows, cut/copy/paste cycles within and between applications, export/import operations, etc.).
3. If the system hardware and software environments enable eye-tracking, spatial gesture recognition and other physical activities of the user, the system may also track attention span between applications and between various activities based on such parameters as gaze direction and content scanning, changes in pose and body distance from the monitor and other indicators.
4. Where applicable, spatial gestures and body position may be tracked utilizing sensors of wearable devices of the user, such as activity tracking or position sensing wristware (wristbands, smart watches), smart glasses/clothing/earware, etc. Relevant parameters may be wirelessly transferred by device specific components of the system to a tracking subsystem.
5. Once the user activates the word processing application and starts typing (or continues typing after a timeout), the system may measure an uninterrupted typing time period and, if possible, an attention focus based on eye-tracking, spatial gesture recognition, pose identification and other available metrics explained elsewhere in this list. Based on the above tracking data, the system may decide to switch the word processing application into a focus mode. In the focus mode, all formatting and other user interface components are hidden, the writing space is zoomed in to occupy the full application window; optionally, font size may be enlarged and the word processor window on the screen may be maximized. By switching to the focus mode, the system eliminates other distractions from the desktop environment and encourages users to concentrate on the writing task.

6. Font enlargement in the focus mode may be a default or a custom user setting. As to maximizing the application window, system decision may be made in a context of recent interactions between the word processing application and other on-screen applications initiated by the user. For example, if the user arranged two or more windows side-by-side and regularly switched viewing direction or content editing activities between the windows, such user behavior may indicate, for example, writing a review or otherwise utilizing the content of other windows during the data input in the word processor application. In this case, the system may avoid maximizing the focus window or may provide a prompt to allow the user to decide a course of action.

7. Once the system has detected slowing down of user writing tempo or an interruption of text entry, the system may switch the word processor application back to a perspective mode where formatting for a user interface is accessible. The system may also cancel an internal zoom and return fonts to pre-focus values of the fonts. If the word processor window was previously maximized on the computer screen, the system may restore the positions and dimensions of all on-screen application windows to a pre-focus configuration. In addition to keyboard activity of the user (as a tracking parameter), a decision may be induced by changes in a gaze direction, for example, if a view focus of the user has been off the word processing window for a pre-determined period of time. The decision to switch modes may also be facilitated by changes in posture, such as sitting back after a period of intense typing, etc.

8. An auto-clipping mode allows the user to copy portions of content from various application windows directly into the focus mode without dragging text or executing cut-copy-paste shortcuts or menu choices. In the auto-clipping mode, the user may select a fragment of content from another application window, different from the word processing application window. Upon selection, which may be indicated, for example, by releasing a mouse button or lifting a finger from a touch screen after the finger was dragged across the screen to select a portion of content in another windows, the system may switch to a maximized or non-maximized focus mode and may insert the selected content into a word processor window at a new cursor position immediately after the user positions the cursor (clicks) within the word processor window. An undo button or gesture may be offered to the user in case of erroneous positioning.

9. The auto-clipping mode may be detected when a user puts an application window, different from the word processing application window, side-by-side with the word processor window; the system may additionally require certain interaction or switching workflow between the two windows before the system switches to the auto-clipping mode. Arranging multiple windows on the same screen with the word processor window is also possible, as long as each application has a visible portion on the screen for easy activation of the corresponding application and selection of content.

Tracking user behavior during an initial period of switching document view modes between the focus mode and the perspective mode may be accompanied by system learning. Thus, a button (a shortcut, a gesture) for accepting or rejecting a particular automatic switch between the two modes and also allowing the user a manual switching between the modes may be offered by the system. In this way, the system may start with predefined, user independent switching rules and may learn (for example, by training a neural network) on samples of successful and unsuccessful switches during the learning period, using corresponding sets of tracking parameters for improving decision rules. The performance of enhanced switching rules may be tested during a subsequent period when the user still has an opportunity to accept or reject switching; the system doesn't necessarily learn at the stage where the user is accepting or rejecting switching, but rather verifies the quality of previous learning. In case of successful testing, the next, working phase may be conducted in a fully automatic mode.

Rules for switching from a focus or a perspective mode into a clipping mode can be designed analogously. The rules may take into account geometric parameters of several application windows, such as a size of each window and overlapping of each window on the screen with the word processor window and between the windows. In addition, various notification features may be added to an additional application window; for example, when a user resizes and moves a window of an additional application across the computer screen, the system may highlight the window frame when the window being moved has a size and occupies a position in the window layout feasible for switching into a clipping mode. The user may stop dragging and resizing the window leaving the system ready for switching into the clipping mode (which may occur based, for example, on user copy/paste actions between the additional application and the word processor).

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for enhanced document authoring through automatic and manual switching of user document view between a focus mode, with an emphasis on text entry and eliminating unnecessary user interface elements; a perspective mode with a traditional application layout; and an auto-clipping mode where an application window for a currently created document may be arranged side-by-side with other application windows for easy clipping into the authored document.

Figure 1:
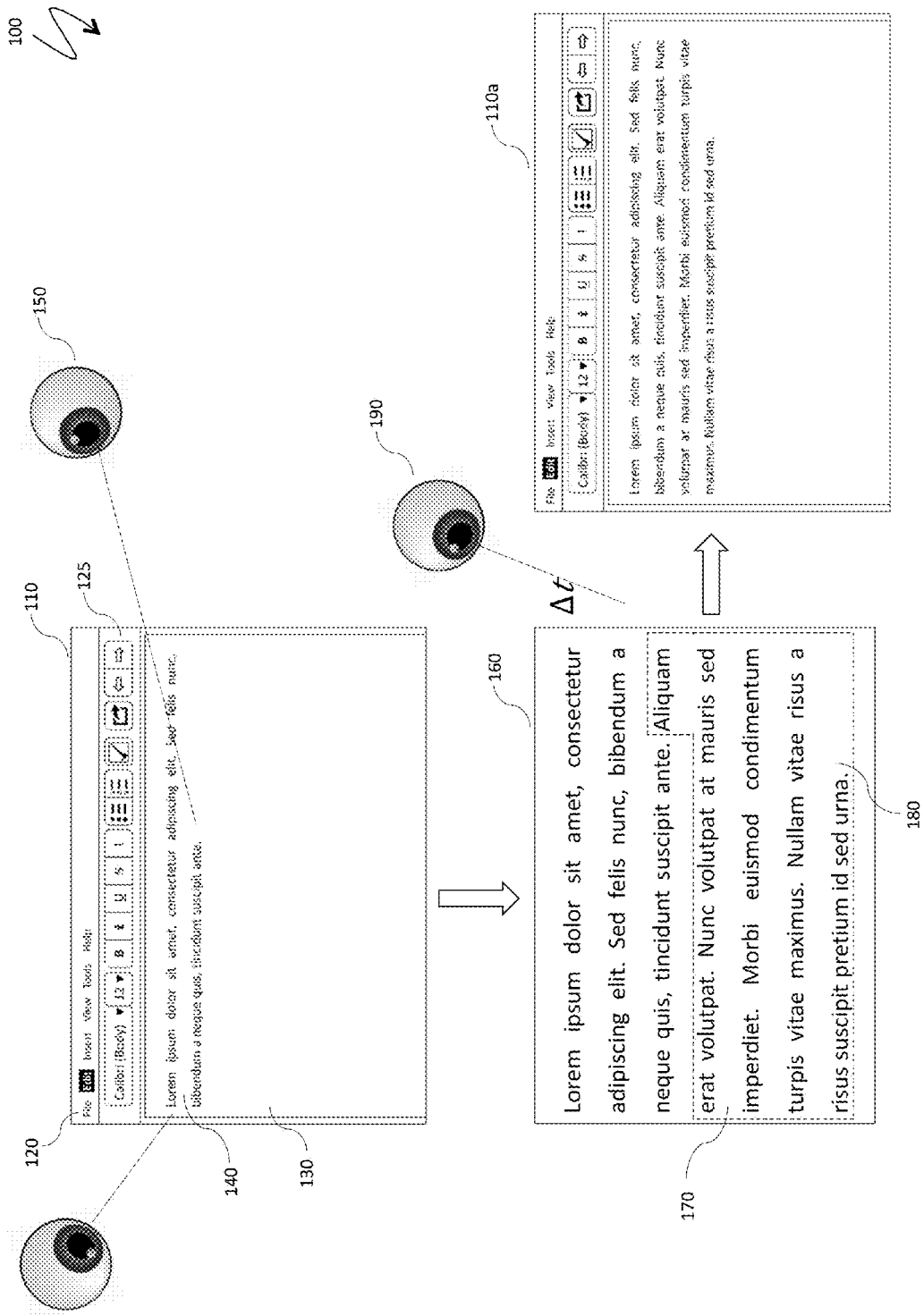
FIG. 1 is a schematic illustration of switching between a focus mode and a perspective mode, according to an embodiment of the system described herein.

FIG. 1 is a schematic illustration 100 of switching between a focus mode and a perspective mode. An application window of a word processor or other document authoring application in a perspective mode 110 (traditional view) may include a menu 120, a toolbar 125 and a document authoring window 130 for entering text and other objects combined within a document.

A user enters an initial fragment of text 140; FIG. 1 illustrates system functioning with an eye tracking mechanism available to the system, as explained elsewhere herein. Accordingly, the eye tracking mechanism detects gaze direction 150 which stays within the document for the period of uninterrupted typing of the text fragment 140. Based on this information, the system switches to a focus mode 160 where unnecessary user interface elements are hidden from user view, font size is enlarged and the window may be maximized on a computer screen, as explained elsewhere herein, in particular, in FIG. 2. Optimal conditions are created in the focus mode for an undistracted text entry.

The user enters an additional text fragment 170 in the focus mode 160 and pauses after the end of a fragment 180. Additionally, a gaze direction 190 has been outside a document window in the focus mode 160 for a sufficient period of time Δt exceeding a predefined system threshold. A pause and change of gaze direction may cause the system to switch from the focus mode 160 back to a new instance of the perspective mode 110a.

Figure 2:
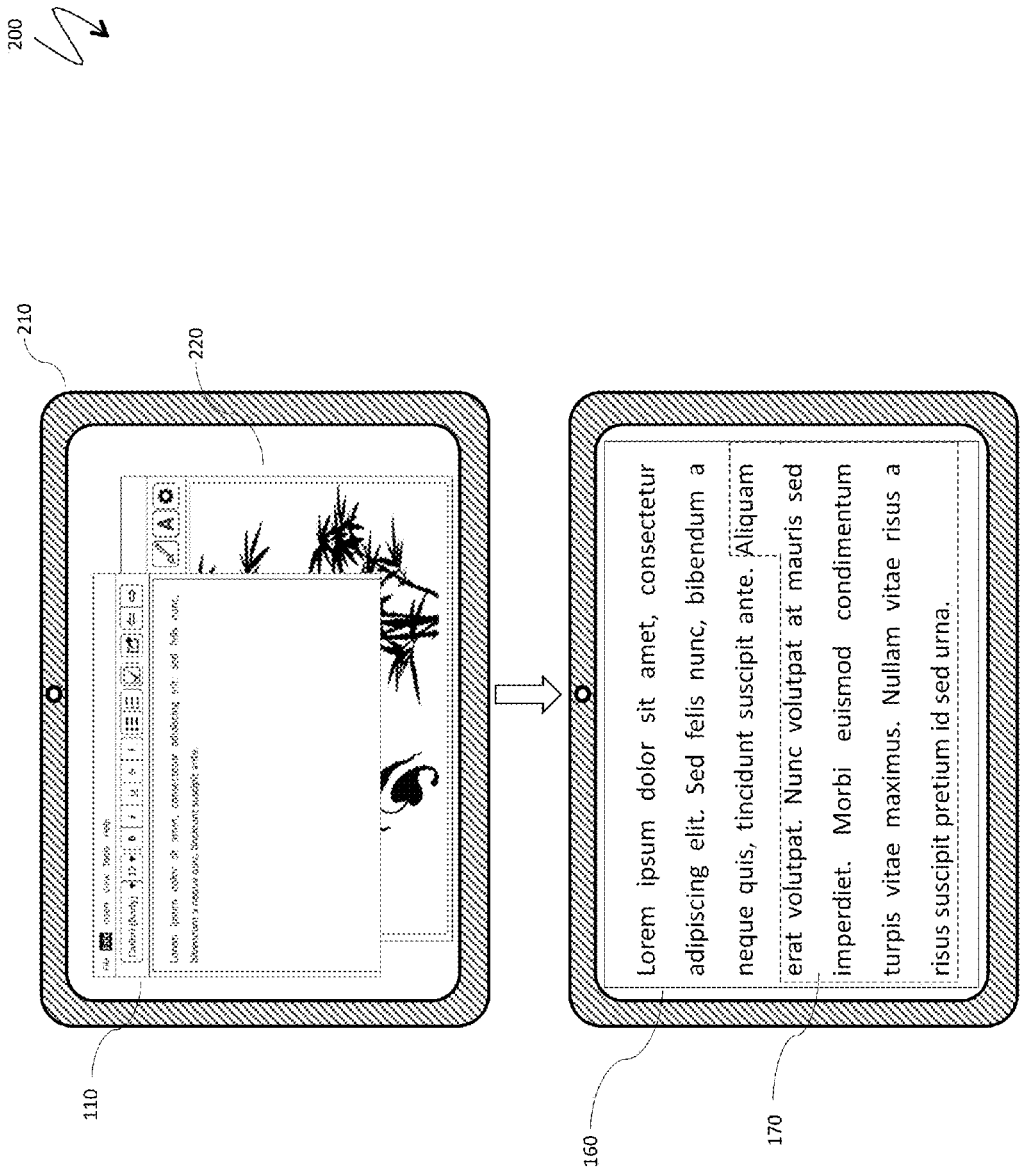
FIG. 2 schematically illustrates content zooming and maximization of the focus window, according to an embodiment of the system described herein.

FIG. 2 is a schematic illustration 200 of content zooming and maximization of the focus window. An application layout on a computer screen 210 initially includes a word processor window in the perspective mode 110 and a drawing application 220. As the system detects text entry and switches the word processor into the focus mode 160, the window of the word processor in the focus mode 160 is enlarged and maximized on the computer screen 210 and the font size is also increased, so that the user may enter the additional fragment of text 170 with maximum convenience.

Figure 3:
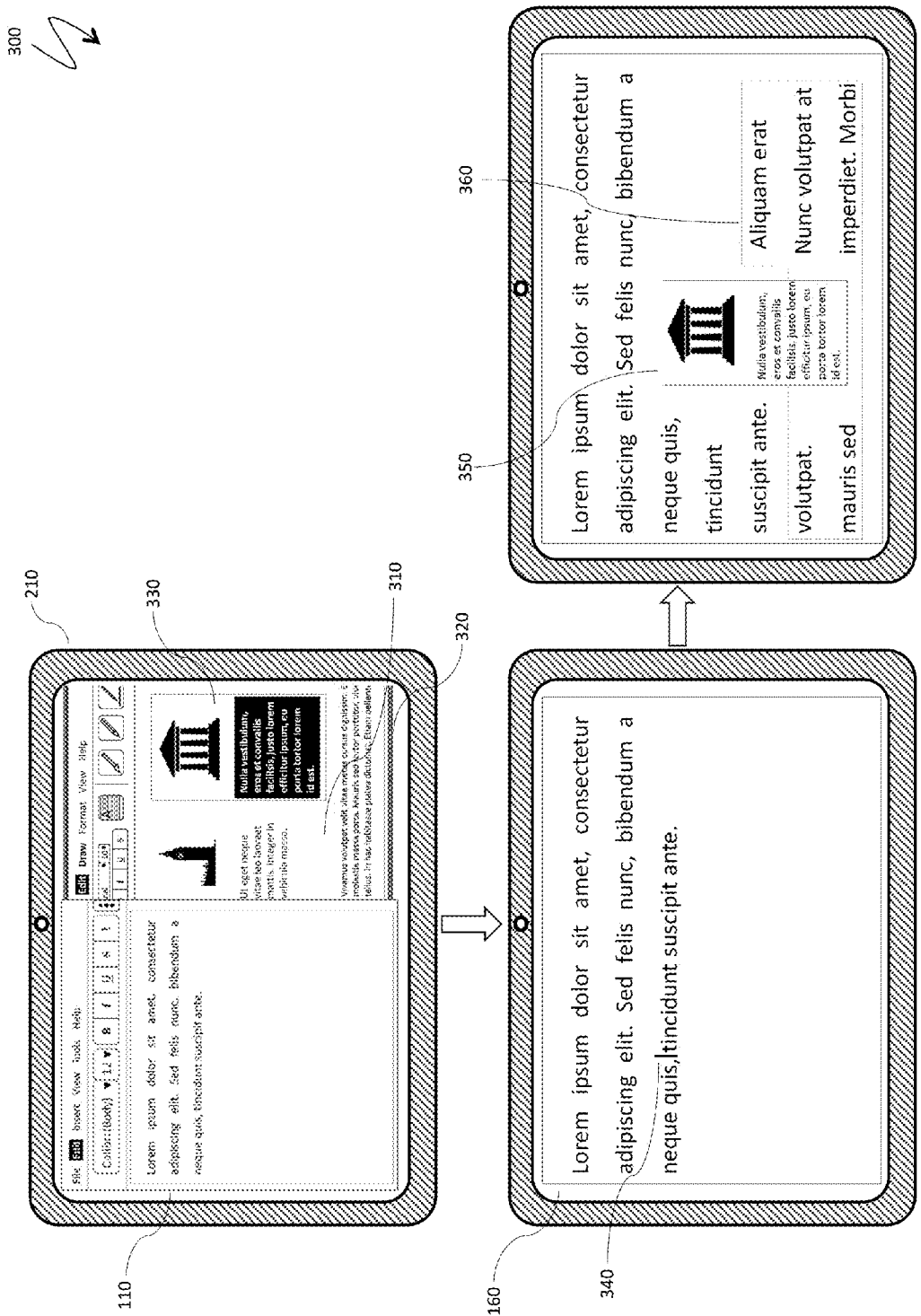
FIG. 3 is a schematic illustration of an auto-clipping mode, according to an embodiment of the system described herein.

FIG. 3 is a schematic illustration 300 of an auto-clipping mode. The computer screen 210 displays two software application windows: a perspective mode 110 of a document authoring application (word processor) and an adjacent window 310 of another application. A highlighted frame 320 of the window 310 shows that a size and position on the screen of the window 310 satisfies geometric requirements for switching to the clipping mode.

A user has selected a portion 330 of the application content in the window 310. Whether the document authoring application stays in the perspective mode 110 or switches to the focus mode 160 (FIG. 3 illustrates the latter option), the user may click in the text entered in the document authoring application, insert an edit bar (text cursor) in a position 340, and the system will automatically clip the selection made in another window and place a corresponding portion 350 at the cursor position 340. If the cursor position 340 splits previously entered text in the window (as shown in FIG. 3) then the text will flow around the inserted portion 350—FIG. 3 exemplifies a left alignment of text with respect to the portion 350. The user may enter additional text 360, which will follow the flow rules, provided that the additional text 360 is in a same area with the inserted corresponding portion 350. For example, in FIG. 3 the additional text 360 starts on a right side of the corresponding portion 350 and flows around the corresponding portion 350 on both left and right sides thereof.

Figure 4:
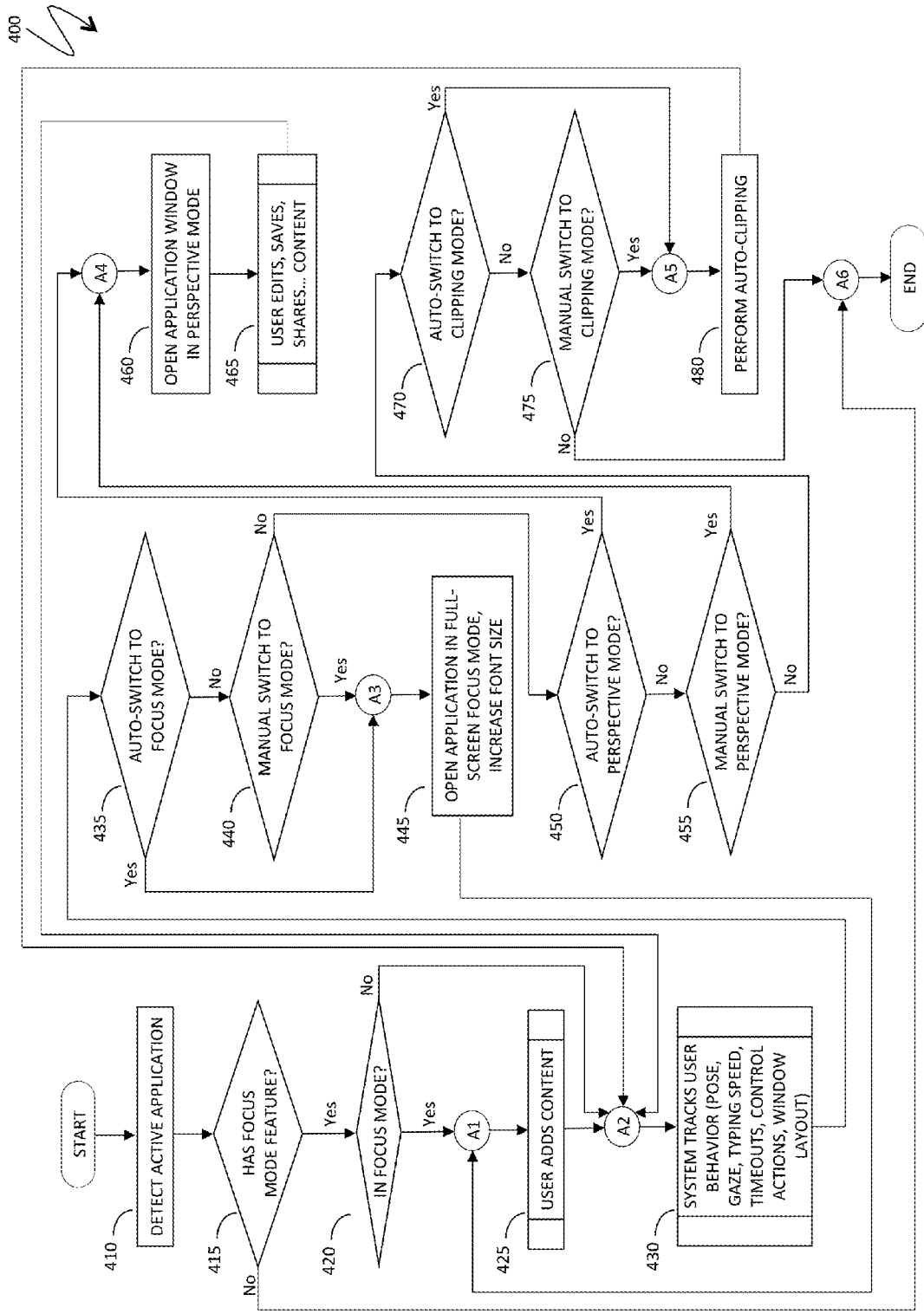
FIG. 4 is a system flow diagram illustrating system functioning, according to an embodiment of the system described herein.

Referring to FIG. 4, a flow diagram 400 illustrates processing performed in connection with functioning of the system described herein. Processing starts at a step 410, where the system detects an active (document processing) application. After the step 410, processing proceeds to a test step 415, where it is determined whether the active application possesses a focus mode feature. If not, processing is complete; otherwise, processing proceeds to a test step 420, where it is determined whether the active application is in a focus mode. If so, processing proceeds to a step 425, where the user adds content to the document in the focus mode. After the step 425, processing proceeds to a step 430 (which can be independently reached from the test step 420 if the text authoring application is not in the focus mode), where the system tracks user behavior, including, but not limited to, measuring relevant and available parameters of pose, gaze, typing speed, timeouts, control actions, windows layout, etc., as explained elsewhere herein. After the step 430, processing proceeds to a test step 435, where it is determined whether user behavior tracked at the step 430 justifies an automatic switch to the focus mode. If not, processing proceeds to a test step 440 where it is determined whether the user desires to manually switch to the focus mode. If so, processing proceeds to a step 445 (which can be independently reached from the test step 435 if it was determined at the step 435 that an automatic switch to the focus mode is justified by the user behavior) where the system opens the document authoring application in the full-screen (maximized) focus mode and may also increase the font size for seamless text entry. Note that if the system were already in the focus mode, the step 445 doesn't incur any action. After the step 445, processing proceeds back to the step 425, discussed above, for another iteration where the user may add more content.

If it is determined at the test step 440 that the user does not want to switch manually to the focus mode, processing proceeds to a test step 450, where it is determined whether the user behavior justifies switching the document authoring application back to a perspective (traditional) mode. If not, processing proceeds to a test step 455 where it is determined whether the user desires to manually switch to the perspective mode. If so, processing proceeds to a step 460 (which can be independently reached from the test step 450 if it was determined at the step 450 that an automatic switch to the perspective mode is justified by the user behavior). At the step 460, the system opens the document authoring application in the perspective mode. After the step 460, processing proceeds to a step 465 where the user edits, saves, shares and performs other operations with the document and content of the document that are characteristic for the traditional perspective mode. After the step 465, processing proceeds back to the tracking step 430 for another iteration.

If it is determined at the test step 455 that the user does not want to switch manually to the perspective mode, processing proceeds to a test step 470, where it is determined whether the user behavior, layout of application windows, and other factors justify switching the document authoring application and adjacent applications running in parallel and satisfying additional conditions, to the clipping mode, as explained elsewhere herein (see, for example, FIG. 3 and the accompanying text). If not, processing proceeds to a test step 475 where it is determined whether the user desires to manually switch to the clipping mode. If so, processing proceeds to a step 480 (which can be independently reached from the test step 470 if it was determined at the step 470 that an automatic switch to the clipping mode is justified). At the step 480, the system assists the user in performing auto-clipping, as explained elsewhere herein. After the step 480, processing proceeds back to the tracking step 430 for another iteration. If it is determined at the test step 475 that the user does not want to manually switch to the clipping mode, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Furthermore, various aspects of the system described herein may be implemented using software, hardware, a combination of software and hardware and/or other computer-implemented modules or devices having the described features and performing the described functions.

The system described herein may run on a smartphone, tablet, laptop, desktop, and/or any appropriate type of processing device. Note that system software may be pre-loaded with the device, installed from an application store, installed from media such as a CD, DVD, etc., and/or downloaded from a Web site. The system may run on computers with operating system such as Macintosh OS, Windows, Linux, as well as on mobile devices running operating systems such as iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of adapting an interface for a word processor displayed by a display of a computing device, comprising:
   automatically switching to displaying, by the display, a focus mode in response to detecting that a user has entered text into a document for a first amount of time, wherein in the focus mode, a window of the word processor shows text of the document and does not show user-actuated controls to apply formatting to the document, save the document, and/or import non-textual objects into the document; and
   automatically switching to displaying, by the display, a perspective mode in response to detecting that a user has stopped entering text for a second amount of time, wherein in the perspective mode, the window of the word processor includes the user-actuated controls, wherein the second amount of time varies based on at least one of: eye-tracking, spatial gesture recognition of the user, physical activities of the user, attention span of the user between applications, content scanning of the user, and changes in position of the user.

2. A method, according to claim 1, wherein the second amount of time varies according to whether a user is looking at the window of the word processor.

3. A method, according to claim 1, wherein the spatial gestures and position of the user are determined using spatial sensors of wearable devices of the user.

4. A method, according to claim 3, wherein the wearable devices of the user include at least one of: activity tracking wristware, position sensing wristware, smart glasses, smart clothing, and smart earware.

5. A method, according to claim 1, wherein the window of the word processor is maximized to a window size that corresponds to a display size of the display when the word processor is in the focus mode.

6. A method, according to claim 1, wherein font size of the text is enlarged when the word processor is in the focus mode.

7. A method, according to claim 1, wherein the window of the word processor is displayed in a first portion of the display of the computing device; the method further comprising:
   switching to displaying, by the display, an auto-clipping mode in response to a user selecting a fragment from a second portion of the display that is distinct from the first portion of the display, wherein, in the auto-clipping mode, the fragment is automatically pasted into the document in response to one of: the user finishing selection of the fragment and the user positioning a cursor inside the window of the word processor.

8. A method, according to claim 7, wherein the user finishes selection of the fragment by releasing a mouse button and, in response thereto, text from the application is inserted at a location in the document corresponding to a location of the cursor in the document prior to selecting the fragment.

9. A method, according to claim 7, wherein following pasting the fragment, a button that allows the user to undo pasting the fragment is displayed by the display.

10. A method, according to claim 7, wherein auto-clipping is performed when the user places the window of the word processor next to the second portion of the display prior to selecting the fragment.

11. A method, according to claim 7, wherein a button that allows the user to accept or reject automatically switching into one of the modes is displayed by the display.

12. A method, according to claim 11, wherein parameters for switching between modes are based, at least in part, on previous choices made by the user to accept or reject automatically switching into one of the modes.

13. A non-transitory computer-readable medium containing software that adapts an interface for a word processor displayed by a display, the software comprising:
   executable code that automatically switches to displaying, by the display, a focus mode in response to detecting that a user has entered text into a document for a first amount of time, wherein in the focus mode, a window of the word processor shows text of the document and does not show user-actuated control to apply formatting to the document, save the document, and/or import non-textual objects into the document; and
   executable code that automatically switches to displaying, by the display, a perspective mode in response to detecting that a user has stopped entering text for a second amount of time, wherein in the perspective mode, the window of the word processor includes the user-actuated controls, wherein the second amount of time varies based on at least one of: eye-tracking, spatial gesture recognition of the user, physical activities of the user, attention span of the user between applications, content scanning of the user, and changes in position of the user.

14. A non-transitory computer-readable medium, according to claim 13, wherein the second amount of time varies according to whether a user is looking at the window of the word processor.

15. A non-transitory computer-readable medium, according to claim 1, wherein the spatial gestures and position of the user are determined using spatial sensors of wearable devices of the user.

16. A non-transitory computer-readable medium, according to claim 15, wherein the wearable devices of the user include at least one of: activity tracking wristware, position sensing wristware, smart glasses, smart clothing, and smart earware.

17. A non-transitory computer-readable medium, according to claim 13, wherein the window of the word processor is maximized to a window size that corresponds to a display size of the display when the word processor is in the focus mode.

18. A non-transitory computer-readable medium, according to claim 13, wherein font size of the text is enlarged when the word processor is in the focus mode.

19. A non-transitory computer-readable medium, according to claim 13, wherein the window of the word processor is displayed in a first portion of the display of the computing device, the software further comprising:

executable code that switches to displaying, by the display, an auto-clipping mode in response to a user selecting a fragment from a second portion of the display that is distinct from the first portion of the display, wherein, in the auto-clipping mode, the fragment is automatically pasted into the document in response to one of: the user finishing selection of the fragment and the user positioning a cursor inside the window of the word processor.

20. A non-transitory computer-readable medium, according to claim 19, wherein the user finishes selection of the fragment by releasing a mouse button and, in response thereto, text from the application is inserted at a location in the document corresponding to a location of the cursor in the document prior to selecting the fragment.

21. A non-transitory computer-readable medium, according to claim 19, wherein following pasting the fragment, a button that allows the user to undo pasting the fragment is displayed by the display.

22. A non-transitory computer-readable medium, according to claim 19, wherein auto-clipping is performed when the user places the window of the word processor next to the second portion of the display that includes the prior to selecting the fragment.

23. A non-transitory computer-readable medium, according to claim 19, wherein a button that allows the user to accept or reject automatically switching into one of the modes is displayed by the display.

24. A non-transitory computer-readable medium, according to claim 23, wherein parameters for switching between modes are based, at least in part, on previous choices made by the user to accept or reject automatically switching into one of the modes.

\* \* \* \* \*